(12) United States Patent
Meinert et al.

(10) Patent No.: US 10,460,054 B2
(45) Date of Patent: Oct. 29, 2019

(54) SIMULATING A PLURALITY OF FIBERS

(71) Applicant: The Procter & Gamble Company, Cincinnati, OH (US)

(72) Inventors: Knut Meinert, Kronberg (DE); Dominik L. Michels, Butzbach (DE)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

(21) Appl. No.: 15/704,374

(22) Filed: Sep. 14, 2017

(65) Prior Publication Data

US 2018/0075640 A1    Mar. 15, 2018

(30) Foreign Application Priority Data

Sep. 15, 2016    (EP) .................................... 16188947

(51) Int. Cl.
| | | |
|---|---|---|
| *G06F 17/50* | (2006.01) | |
| *G06T 13/20* | (2011.01) | |
| *G06T 13/40* | (2011.01) | |
| *G06T 13/60* | (2011.01) | |
| *G06N 3/10* | (2006.01) | |
| *G06T 7/20* | (2017.01) | |

(52) U.S. Cl.
CPC ............ *G06F 17/5009* (2013.01); *G06N 3/10* (2013.01); *G06T 7/20* (2013.01); *G06T 13/20* (2013.01); *G06T 13/40* (2013.01); *G06T 13/60* (2013.01); *G06T 2210/21* (2013.01); *G06T 2210/24* (2013.01)

(58) Field of Classification Search
CPC ...................................................... G06T 13/40
USPC ......................................................... 345/474
See application file for complete search history.

(56) References Cited

U.S. PATENT DOCUMENTS

| | | |
|---|---|---|
| 7,450,122 B2 | 11/2008 | Petrovic et al. |
| 7,468,730 B2 | 12/2008 | Petrovic et al. |
| 8,743,124 B2 | 6/2014 | Audoly et al. |
| 8,803,887 B2 | 8/2014 | McAdams et al. |
| 2005/0212800 A1 | 9/2005 | Petrovic |
| 2007/0279413 A1* | 12/2007 | Leveque ............... G06T 11/203 345/419 |

(Continued)

OTHER PUBLICATIONS

Bergou et al., "Discrete elastic rods", ACM Transactions on Graphics (TOG), ACM, US, vol. 27, No. 3, Aug. 2008, pp. 1-63.

(Continued)

*Primary Examiner* — Shivang I Patel
(74) *Attorney, Agent, or Firm* — Alexandra S. Anoff

(57) ABSTRACT

A computer-implemented method for simulating a plurality of fibers is disclosed. It may be applied in particular for simulating the mechanical behavior of a tress or head of hair, woven or nonwoven fabrics, brushes, or other products incorporating fibrous material. The method comprises: providing a computational model for describing mechanical behavior of fibers; obtaining a set of fiber mechanical parameters, associated with fibers of a predetermined type, for use with the computational model; obtaining geometry information, describing the shape and position of the plurality of fibers to be simulated; and simulating, using the computational model, the set of fiber mechanical parameters, and the geometry information, a change in configuration of the plurality of fibers, to produce a second geometry information.

15 Claims, 4 Drawing Sheets

(56) References Cited

U.S. PATENT DOCUMENTS

| | | | |
|---|---|---|---|
| 2010/0277475 A1* | 11/2010 | McAdams | G06T 13/40 345/420 |
| 2011/0273445 A1* | 11/2011 | Coutinho | G06T 13/20 345/419 |
| 2014/0198108 A1 | 7/2014 | Sigal | |

OTHER PUBLICATIONS

Derouet-Jourdan et al, "Inverse dynamic hair modeling with frictional contact", ACM transactions on Graphics (TOG), ACM, US, vol. 32, No. 6, Nov. 2013, pp. 1-159.

European Search Report for EP16188947.2 dated Mar. 20, 2017.

Kelly Ward et al., "A survey on hair modeling: styling, simulation and rendering", IEEE Transactions on Visualization and Computer Graphics, IEEE Service Center, Los Alamitos, CA, US, vol. 12, No. 2, Mar. 2007, pp. 213-234.

PCT International Search Report and Written Opinion for PCT/US2017/051457 dated Dec. 14, 2017.

Tomas Lay Herrera et al., "Lighting hair from the inside: a thermal approach to hair reconstructions", ACM Transactions on Graphics (TOG), vol. 31, No. 6, Nov. 2012, pp. 1-146.

Wei-Chin Lin, "Boundary handling and porous flow for fluid-hair interactions", Computers and Graphics, vol. 52, Jun. 27, 2015, pp. 33-42.

All final and non-final office actions for U.S. Appl. No. 16/288,218.

Anonymous: "Artificial neural network—Wikipedia, the free encyclopedia", Jul. 11, 2015, https://en.wikipedia.org/w/index.php?title=Artificial_neural_network&oldid=670995295, p. 1, paragraph 1-2.

Klaus Mosegaard et al: "Monte Carlo analysis of inverse problems", Inverse Problems, vol. 18, No. 3, Jun. 2002, pp. R29-R54.

PCT International Search Report and Written Opinion for PCT/US2017/051711 dated Oct. 27, 2017.

U.S. Appl. No. 16/288,218, filed Feb. 28, 2019, Meinert et al.

* cited by examiner

SIMULATING A PLURALITY OF FIBERS

FIELD OF THE INVENTION

The present invention relates to a computer-implemented method for simulating a plurality of fibers. The method may be applied in particular for simulating the mechanical behavior of a tress or head of hair. It can also be applied for simulating woven or nonwoven fabrics, brushes, or other products incorporating fibrous material.

BACKGROUND OF THE INVENTION

It is known to try to simulate an assembly of fibers, such as a tress or head of hair, for example for computer graphics animation. However, known approaches are not realistic enough. In particular, they tend not to capture the mechanical behavior of the fibers in a physically accurate way. It would be desirable to simulate fibers, such as hair, in a way that was more faithful to the mechanical behavior of those fibers in the real world.

SUMMARY OF THE INVENTION

The invention is defined by the claims.

According to an aspect of the invention, there is provided a computer-implemented method for simulating a change in configuration of a plurality of fibers, the method comprising:

providing a computational model for describing mechanical behavior of fibers;

obtaining a first set of fiber mechanical parameters, associated with fibers of a predetermined type, for use with the computational model;

obtaining first geometry information, describing the shape and position of the plurality of fibers to be simulated; and simulating, using the computational model, the first set of fiber mechanical parameters, and the first geometry information, the change in configuration of the plurality of fibers, to produce second geometry information, wherein the first set of fiber mechanical parameters includes at least one, any two, or all three of:
  one or more coefficients of friction between fibers of the predetermined type;
  a measure of cohesion among fibers of the predetermined type; and
  a measure of adhesion among fibers of the predetermined type.

The present inventors have recognized that there is a need for better characterization of the mechanical parameters of fibers in general and of hair fibers in particular. Whereas previous approaches have focused on the stiffness or flexibility of individual fibers, the present inventors have found that accurate characterization of the interactions between fibers is important for the overall accuracy of a simulation of a plurality of fibers. The behavior of a body made of fibers is influenced by the complex network of collisions (contact points) between the fibers, and how the fibers interact when they collide. Friction, cohesion, and adhesion have been found to be the three most important parameters governing interactions between fibers.

Adhesion refers to a force that opposes the separation of two hair fibers that are in contact with one another, where there is no liquid present at the point of contact.

Cohesion refers to a force that opposes the separation of two hair fibers that are in contact with one another, where there is a liquid present between them at the point of contact. Cohesion depends on capillary forces and the Laplace pressure.

The cohesion and adhesion forces are preferably normalized by the area of contact, in the set of fiber mechanical parameters.

Preferably, the first set of fiber mechanical parameters includes two or more coefficients of friction, wherein each coefficient of friction pertains to a different mutual orientation. This can allow anisotropic friction effects to be described.

The first set of fiber mechanical parameters preferably further includes at least one, any two, or all three of: a Young's modulus associated with fibers of the predetermined type; a shear or torsional modulus associated fibers of the predetermined type; and a bending modulus associated with fibers of the predetermined type.

The parameters characterizing interactions between fibers are preferably combined with an accurate characterization of the mechanical characteristics of the individual fibers. In particular, it is advantageous to characterize the flexibility of individual fibers in sufficient detail. In this regard, the Young's modulus, the bending modulus and the torsional modulus have been found to be the most important parameters. Torsional modulus is related to shear modulus.

The first set of fiber mechanical parameters preferably further includes at least one, any two, or all three of: a diameter associated with fibers of the predetermined type; a material density of fibers of the predetermined type; and a cross-sectional shape or an ellipticity associated with fibers of the predetermined type It is advantageous to combine these other fiber mechanical parameters with the parameters discussed above characterizing interactions and characterizing the flexibility of individual fibers.

The change in configuration that is simulated optionally comprises at least one of: motion of the fibers; mechanical manipulation of the fibers; shortening or lengthening of the fibers; and a chemical or physical treatment of the fibers that modifies their mechanical behavior.

In general, the change in configuration may be associated with a change in the geometry of the fibers, or a change in their mechanical parameters, or both. Motion, mechanical manipulation (such as combing, braiding, or grooming), and cutting of the fibers may be associated with changes in the geometry of the fibers. Chemical treatment such as shampooing, conditioning, coloring, perming, relaxing, or bleaching may be associated with changes in the mechanical parameters. Heat treatment such as crimping, curling, straightening, or blow-drying may be associated with changes in both the geometry and the mechanical parameters.

The method may further comprise: providing a database comprising a set of fiber mechanical parameters for each of a plurality of different types of fiber, wherein the step of obtaining the first set of fiber mechanical parameters comprises choosing one of the sets in the database.

Different types of fiber may respond very differently to changes in configuration; therefore, it is desirable to be able to accurately characterize the mechanical behavior of the particular type of fiber that is to be simulated. Nevertheless, measuring fiber mechanical parameters may be difficult, time-consuming, or in some cases impossible, for given fibers in the real world. It may therefore be advantageous to provide a database or library of fiber mechanical parameters, which records the fiber mechanical parameters of types of fibers that have previously been measured. The fiber mechanical parameters for the simulation can then be retrieved from this database, for example, by selecting the type of fiber from a list.

Using a database or library like this can also allow simulation of the effect of a change in the fiber parameters, by replacing one set of fiber mechanical parameters chosen from the database with another set.

The database may comprise one or more additional sets of fiber mechanical parameters for each type of fiber, wherein each of the one or more additional sets characterizes the mechanical parameters of that type of fiber after a respective chemical or physical treatment.

If the fibers are hair fibers, for example, this can allow prediction of the geometry (and therefore appearance) of a head of hair after a given treatment is applied to it. The treatment will change the mechanical parameters and the simulation predicts how this will alter the configuration (geometry) of the hair.

The first and second geometry information preferably describes the positions of a plurality of segments of each of the fibers.

In this case, the computational model may model each fiber as a chain of segments.

The geometry information may also comprise a junction distribution among fibers of the predetermined type. Alternatively, the junction distribution may be implicit in the geometry information and/or may be determined from it during the simulation. Together with the second geometry information (that is, the position of each segment), the simulation optionally also outputs a velocity of each segment.

The first geometry information may be obtained from a real sample of fibers and the step of obtaining the first geometry information preferably comprises at least one of: micro computed tomography; laser scanning; IR-imaging; and optical coherence tomography.

Obtaining geometry information from a real sample of fibers in this way can allow more accurate capture of fiber geometry. It can also allow simulation of a change in configuration of the real fibers in their real geometry. Thus, it can allow a virtual prediction of a change in configuration of fibers in the real world.

The computational model may comprise at least one of: a Cosserat rod for each fiber; a finite element based description for each fiber; a Kirchoff rod for each fiber; and an oscillator network for each fiber.

Optionally, the oscillator network for each fiber may comprise a cuboidal or tetrahedral oscillator network.

The computational model preferably also takes into account environmental conditions, including but not limited to: temperature, humidity, and stochastic wind effects.

The method may further comprise rendering, based on the simulation, one or more images showing the plurality of fibers after the change in configuration.

Rendering an image can allow the change in configuration to be visualized. Rendering a plurality of images can allow the change in configuration to be visualized as an image sequence (for example, an animation or movie).

The plurality of fibers preferably comprises a tress of hair or a head of hair.

When the fibers are hair fibers, the different types of fiber may be associated with different hair colors, different ethnicities, and/or different levels of damage. Preferably, sets of fiber mechanical parameters for these different types of hair are stored in the database.

The method optionally further comprises: receiving target geometry information defining a desired configuration of the plurality of fibers; and deriving, based on the target geometry, a target set of fiber mechanical parameters suitable for producing the target geometry, wherein deriving the target set of fiber mechanical parameters preferably comprises: generating a plurality of modified sets of fiber mechanical parameters; for each of the modified sets, simulating the change in configuration produced by that modified set; and selecting as the target set the modified set which produces a change in configuration that best approximates the target geometry.

This uses an analysis-by-synthesis approach, preferably deriving the target set of fiber mechanical parameters by iterating the simulation summarized earlier above.

Also provided is a non-transitory computer readable medium comprising a computer program comprising computer program code configured to control a physical computing device to perform all the steps of a method as summarized above when said program is run on the physical computing device.

DETAILED DESCRIPTION OF THE INVENTION

Figure 1:
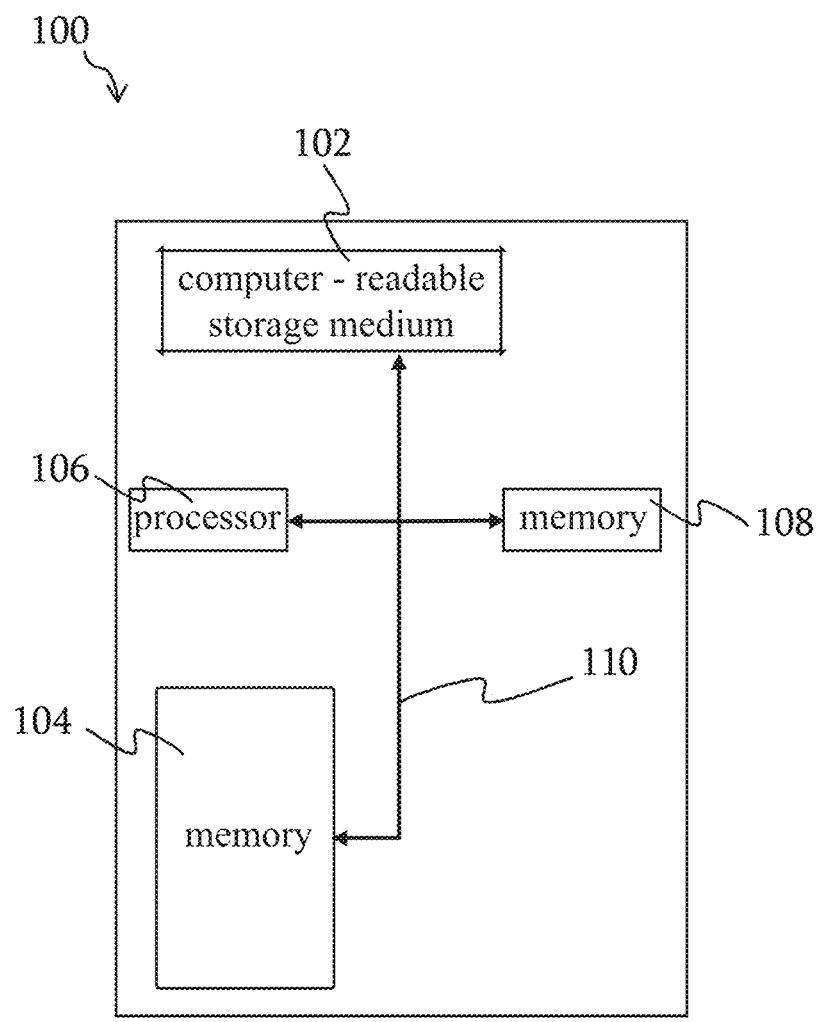
FIG. 1 is a schematic block diagram illustrating an exemplary computer system upon which embodiments of the invention may run.

FIG. 1 of the accompanying drawings schematically illustrates an exemplary computer system 100 upon which embodiments of the present invention may run. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

According to embodiments of the invention, the interface 108 may alternatively or additionally comprise an interface to a measurement system, for measuring fiber mechanical parameters of real fibers. In some embodiments, the interface 108 may comprise an interface to a geometry capture system, such as a 3-D scanner, for capturing the geometry of a plurality of real fibers.

It will be appreciated that the architecture of the computer system 100 illustrated in FIG. 1 and described above is merely exemplary and that systems having different architectures using alternative components or using more components (or fewer) may be used instead.

In the following, the invention will be described in the context of embodiments in which the fibers are hair fibers. However, as will be apparent to those skilled in the art, the scope of the invention is not limited to such embodiments and it can be used to simulate any type of fiber.

Figure 2:
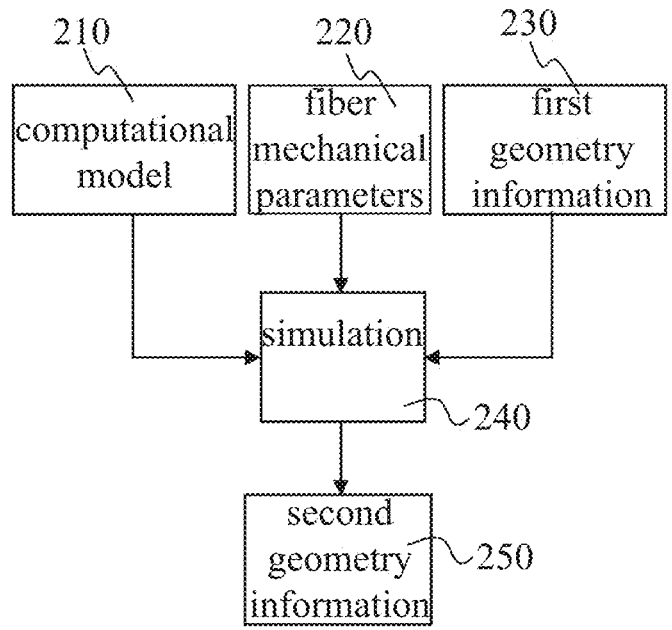
FIG. 2 is a flow diagram showing a logical information flow in a method according to an embodiment of the invention.

FIG. 2 illustrates a logical information flow in a method according to an embodiment of the invention. A simulation 240 of a plurality of fibers relies on three pieces of information: a computational model 210; a set of fiber mechanical parameters 220; and first geometry information 230. The simulation 240 combines these to simulate a change in configuration of the plurality of fibers. The new configuration is represented by second geometry information 250.

The computational model 210 preferably models each fiber as a chain of individual segments. The first geometry information 230 provides the initial positions for each of the segments of each fiber. The simulation 240 steps incrementally forward in time, starting from these initial positions (and optionally also information about initial velocities), using the computational model 210 to describe the mechanical behavior of the system of fibers. The mechanical response of the computational model 210 is governed by the values of the fiber mechanical parameters 220.

In this embodiment, the fibers are hair fibers and the aim is to simulate a change in configuration of a head of hair. The change of configuration to be simulated may be a virtual representation of a real (that is, physically realizable) modification or manipulation of the hair. It may include motion of the hair, for example under gravity or due to some perturbation, but simulation of motion is not essential.

Figure 3:
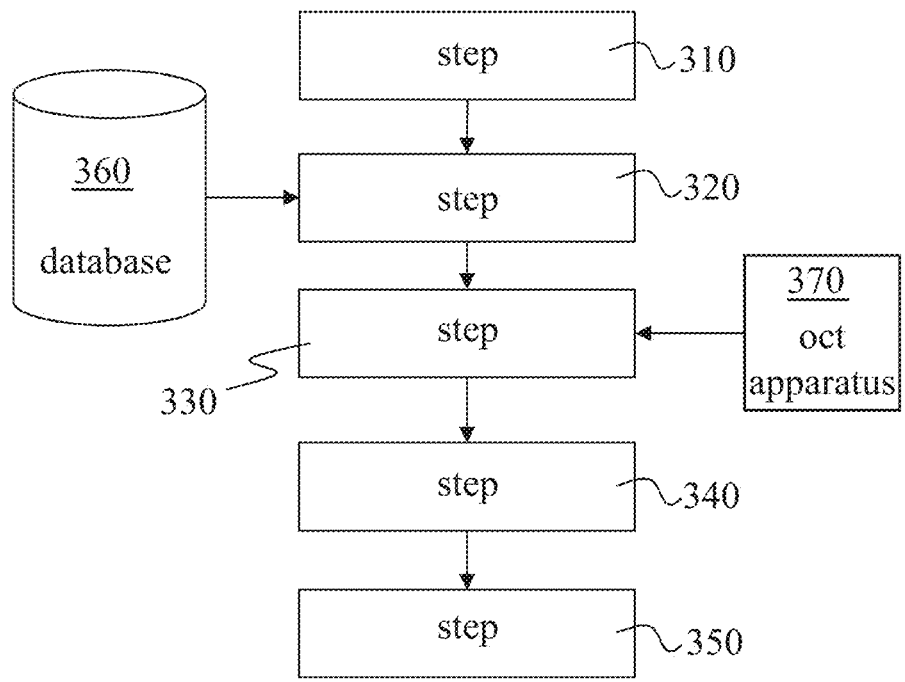
FIG. 3 is a flowchart of a simulation method according to an embodiment.

FIG. 3 is a flowchart of a simulation method according to an embodiment. In step 310, the computational model 210 is provided. The computational model 210 may be stored in the storage medium 102 from where it is retrieved by the processor 106. Next, in step 320, the processor 106 obtains a first set of fiber mechanical parameters associated with fibers of a predetermined type, for use with the computational model 210. In step 330, the processor 106 obtains first geometry information 230 describing the shape and position of the plurality of fibers to be simulated. Then, in step 340, the processor 106 uses the computational model 210, the fiber mechanical parameters 220, and the first geometry information 230 to simulate the change in configuration of the fibers. The output of the simulation is second geometry information, describing the new shape and/or position of the fibers. Optionally, in step 350, the processor 106 renders one or more images of the fibers, based on the second geometry information produced by the simulation. This can allow a user to inspect the new hair geometry on a display screen.

In the embodiment pictured in FIG. 3, the first geometry information 230 is obtained from a real sample of fibers. Specifically, the processor 106 obtains the geometry information from Optical Coherence Tomography (OCT) apparatus 370. OCT apparatus 370 is interfaced to the computer system 100 via interface 108. Optical coherence tomography can be used to capture the 3-D geometry of a body of hair fibers as it is sensitive to differences in the refractive index of materials. OCT can allow individual structures to be resolved with high-resolution. The real sample of fibers used to generate the geometry information may be a small tress of hair or a full head of hair.

In general, it may not be possible to obtain measurements of fiber mechanical parameters 220 from the same sample of hair used to generate the first geometry information 230. For example, measuring the fiber mechanical parameters may require the hair to be cut, damaged, and/or tested in complex measurement equipment. To avoid the need to measure fiber mechanical parameters directly from the tress or head of hair that was used to generate the geometry information, in step 330 of FIG. 3 the processor 106 obtains the first fiber mechanical parameters from a database 360. This database stores fiber mechanical parameters for each of a plurality of different hair types. These types may be defined according hair color (for example, blonde hair, red hair, dark hair) and/or ethnicity (for example, Afro-Caribbean hair, Western European hair, etc.). The database preferably stores fiber mechanical parameters associated with each of these hair types in each of a plurality of states of damage. And for each hair type at each level of damage, the database preferably stores fiber mechanical parameters associated with the results of a plurality of different hair treatments, as well as for the "virgin" untreated hair. Thus, when indexed by specifying a hair type, level of damage, and hair treatment, the database will return the relevant fiber mechanical parameters for use with the computational model. This database can be constructed in advance, by mechanical analysis of suitable small samples of hair.

In the present embodiment, the set of fiber mechanical parameters comprises a hair mechanical fingerprint including six parameters. Three parameters define the interactions between hair fibers; these are: at least one coefficient of friction between fibers; the cohesion among fibers; and the adhesion among fibers. Three further parameters define the mechanical characteristics of individual fibers; these are: the Young's modulus of the fibers; the torsional modulus of the fibers; and the bending modulus of the fibers. Preferably, the set of fiber mechanical parameters also includes: the diameter of the fibers; the ellipticity of the cross-sectional shape of the fibers; and the material density of each fiber. The fiber mechanical parameters will be discussed in greater detail later below.

In the present embodiment, the computational model describing each fiber is based on a Cosserat rod, discretized into segments. The Cosserat rod model itself will be familiar to those skilled in the art. The model also includes a measure of damping in the hair fiber system, which describes the interaction of the fibers with air or other gaseous substances and or water or other liquids. The damping effect is a function of environmental conditions such as temperature and humidity; therefore, it is not part of the fiber mechanical parameters but rather a global parameter of the computational model.

As explained previously above, the geometry information defines the starting position of each segment of each fiber in the model. The simulation determines the number of connection points between fibers based on the geometry information. This is done using collision-detection functionality in the software. The number of connection points defines a junction distribution of the plurality of fibers.

The simulation method illustrated in FIG. 3 can be used for a variety of different purposes.

In a first example, the simulation can be used to simulate a change in hairstyle. This can be done as part of a consultation with a customer in a hair salon. In this case, the first geometry information describes the starting hairstyle. The first geometry information defines the position of each hair fiber in a virtual head of hair. This virtual head of hair may be based on the captured 3-D geometry of the customer's existing hairstyle. The fiber mechanical parameters for simulating the hair are obtained from the database 360. The database entry is chosen which best matches the ethnicity, hair color, and level of damage of the customer's actual hair. To simulate cutting the hair, the length of each fiber in the virtual head of hair may be shortened. The method then simulates the effect of having changed the lengths of the fibers—stepping forward in time until the position of each hair reaches a steady state again. The new steady-state geometry of the hair fibers represents the result of the haircut for that customer. This can allow a physically accurate prediction of how the customer's hair will appear after cutting. This prediction can be rendered and displayed on a screen for the customer's approval or feedback.

If desired, the method can also simulate the effect of the hair growing back, after the haircut. This is done by successively increasing the length of each fiber in the virtual head of hair and rerunning the simulation at each length. This can allow an animated sequence of images to be rendered, showing how the cut hair will grow out over time.

As a further option, if desired, the method can also be used to simulate the dynamic appearance of the new haircut. This can be done by (virtually) moving or shaking the position of the head in the simulation. The simulation then steps forward incrementally in time, to predict how the hair fibers will follow the movement of the head. Images are rendered at each step, to create, frame-by-frame, an animation of the moving head of hair.

If the customer will be going on holiday to a different country, the simulation can be programmed with the climatic and/or weather and/or water conditions in that country. This can allow the appearance of the hairstyle to be predicted under those environmental conditions (which may be different from the conditions in the hair salon). For example, an increase in humidity may make the hair heavier, may change its stiffness, and/or may increase frizz; or a change in the mineral content of the water used for hair cosmetic treatment can make the hair stiffer or softer. These changes may suitably be simulated by the method.

As will be apparent from the foregoing, simulations such as these can allow a hairdresser or stylist to communicate with a customer more effectively. Customers may be reassured by the ability to predict the final outcome of the hair cutting and may be able to instruct the hairdresser/stylist more clearly as to their wishes.

In a second example, the method can be used to simulate the treatment of a customer's hair with a hair cosmetic product. Again, this might be done as part of a consultation with a customer in a hair salon. Alternatively, it could be done at a point-of-sale of the hair cosmetic product, such as in a retail store selling beauty products. To support this use-case, the database 360 includes fiber mechanical parameters for different types of hair when treated by different hair cosmetic products. Note that these fiber mechanical parameters may be obtained from small samples of the relevant types of hair in advance. This avoids the need to treat a whole head of hair with the hair cosmetic product. Nevertheless, using the method of FIG. 3, the appearance of a whole head of hair treated by the hair cosmetic product can be predicted by virtual simulation. The first geometry information may be obtained by a 3-D scan of the customer's head. The customer (or a hair stylist or product sales assistant) then inputs the type of the customer's hair manually—for example, by selecting the customer's ethnicity, hair color, and level of damage from drop-down menus in a user interface.

The method can then simulate the steady-state geometry of the customer's hair after treatment by the hair cosmetic product, by using the corresponding stored set of hair fiber mechanical parameters from the database 360. Essentially, the simulation allows extrapolation from a test on a small sample (tress) of hair to predict the appearance of a full head of hair.

An image showing the predicted appearance of the customer's hair after treatment can be rendered and displayed to the customer. Optionally, an image can also be rendered of the customer's hair in its current geometry. This can allow a side-by-side comparison of two virtual images, showing the predicted difference in appearance as a result of using the hair cosmetic product.

Simulations such as this may also be useful in industrial research laboratories, for the development of new hair cosmetic products. Instead of extensively testing the new product formulation on real models in a test salon, the method of FIG. 3 can be used to simulate the effect of the product on the appearance of many different heads of hair, with different hairstyles. This can be achieved while only needing to treat small samples of hair (to determine hair fiber mechanical parameters for the different hair types after treatment, in order to populate the database 360). It may also be possible to interpolate among treatment results. For example, the new product formulation could be tested firstly on blonde hair with a light level of damage, and secondly on blonde hair with a heavy level of damage, measuring the hair fiber mechanical parameters from a small tress of treated hair in each case. The method may then interpolate the hair fiber mechanical parameters for blonde hair with a medium level of damage, by linear or nonlinear interpolation between the hair fiber mechanical parameters for the two extreme cases. In this way, the number of real experiments needed can be reduced, while obtaining a richer set of information about the likely effect of the new product formulation. This feedback can be used to guide the development process, helping product formulation experts to arrive at a suitable product formulation in a smaller number of iterations and with a smaller number of tests than was previously possible.

Other virtual experiments with the hair fibers can also be conducted in a similar way. For example, the method can be used to simulate interactions such as brushing or combing the hair.

Further details of the fiber mechanical parameters will now be provided.

There are several ways to measure friction, adhesion, and cohesion. This can be done using an assembly of multiple fibers (wherein the number of fibers is preferably known). Alternatively, it can be done by measuring interactions between single fibers. For example, Atomic Force Microscopy (AFM) with modified tips can be used to measure the interactions between one single fiber and another single fiber. Conventionally, AFM uses a cantilever with a sharp tip (such as a Silicon crystal) as a probe. To use AFM with hair fibers, this sharp-tipped probe is replaced with a short piece of hair fiber (<1 mm). The fiber may be mounted in a resin, in order to secure it. A second fiber is mounted on the AFM stage in a similar manner. The interactions between the two fibers can then be measured by the AFM apparatus. Alternatively, the tip of the conventional probe can be chemically functionalized—for example with an amino functionalized ($—NH3^+$) coating. This will cause a greater attraction between the tip (which is now positively charged) and negatively charged surface areas of the hair, characterized by $—COO^-—SO_3$ groups. This can be useful for detecting which parts of the hair fiber are uncoated and which parts are coated with a liquid. The application of AFM to hair fibers is described in Wood et al. (Claudia Wood, Albert Budiman Sugiharto, Eva Max, and Andreas Fery, "From conditioning shampoo to nanomechanics and haptics of human hair", J. Cosmet. Sci., 62, 259-264, March/April 2011). Friction, adhesion, and cohesion can also be measured using the so-called Surface Force Apparatus (SFA), further details of which can be found in Israelachvili et al. (J Israelachvili, Y Min, M Akbulut, A Alig, G Carver, W Greene, K Kristiansen, E Meyer, N Pesika, K Rosenberg, and H Zeng, "Recent advances in the surface forces apparatus (SFA) technique", Reports on Progress in Physics, Vol. 73, No. 3, 2010).

In the present embodiment, the preferred way of measuring the friction, adhesion and cohesion for use in the mechanical fingerprint is the SFA, as it can generate measurement conditions that are as close as possible to the real world on the head of a person.

The coefficient of friction characterizes the amount of force required to move one hair fiber that is in contact with another hair fiber. Coefficients of friction are preferably measured for at least two different mutual orientations of the motion vectors of the fibers, because hair fibers are not uniformly smooth and exhibit different roughness and therefore a different coefficient of friction in different directions. Essentially, the measurement involves rubbing one fiber against the other and measuring the force required to do this. A similar measurement can alternatively be made with multiple fibers of the same type rubbing against each other at the same time, by dividing by the number of fibers. In the present embodiment, the coefficient of friction is measured between hair fibers at 90° to one another. The first fiber is then moved along the longitudinal direction of the second fiber. The coefficient of friction is measured in each direction (sliding the first fiber along the second fiber in the root-to-tip direction of the second fiber; and sliding the first fiber along the second fiber in the tip-to-root direction). This gives two coefficients of friction for the set of fiber mechanical parameters. These coefficients are typically very different to one another: the cuticle angle provides an interlocking mechanism, when the first fiber is sliding against the up-lifted orientation of the cuticle; but when the sliding is in the cuticle scale direction, the coefficient of friction is about 50% lower.

Like the coefficients of friction, adhesion and cohesion are preferably determined by making force measurements using load cells, with the hair fibers at right angles to one another. The hair fibers may be encapsulated in resin at each end, in order to hold them in place. Whereas the friction measurement requires one fiber to slide along the other, the adhesion and cohesion measurements are made at individual junction locations (crossover points).

The adhesion characterizes the "stickiness" of the fibers due to their surface properties—that is, their tendency to adhere to one another. Thus, adhesion can be derived by measuring the amount of force required to separate two fibers. In adhesion, no material transfer from one fiber to the opposite fiber occurs.

The cohesion characterizes the bonding between fibers caused by the presence of liquid between them. It is common for liquid deposits to be present on the hair fibers. For example, even on natural, untreated hair, glands in the hair follicle produce sebum, which is deposited on the hair fiber. Although shampoo removes sebum, other hair treatments replace it with other liquid deposits. For example, conditioner may deposit silicone on the hair fibers.

The liquid is typically unevenly deposited along the length of a hair fiber. Therefore, the attractive forces between the fibers may be different, depending on where the fibers cross. Adhesion characterizes the bonding between fibers at a junction where no liquid is present. Cohesion characterizes the bonding between fibers at a junction with liquid present. Therefore, including cohesion in the set of fiber mechanical parameters characterizes the effect of liquid deposits on the fibers, as well as the fibers themselves. For example, cohesion might characterize the binding of two hair fibers at a junction via a silicone droplet that connects them there. Cohesion is defined by the capillary forces between the two fibers, caused by the liquid silicone droplet.

Totally clean hair fibers can be considered to have no deposits on their surface. Their outermost layer in this "virgin" state is the so-called 18-MEA or F-layer. When hair is damaged, the F-layer is partly or fully removed and thus the surface properties of hair change from hydrophobic to hydrophilic. This different surface energy also influences the deposition of active compounds on the hair surface. On hair with different surfaces energies, hair cosmetic actives will deposit differently, leading to different capillary forces between fibers, caused by hair cosmetic actives, causing different cohesion forces/energies.

To measure cohesion, one must find a crossover point between the two fibers where liquid is present. To measure adhesion, one must find a crossover point where no liquid is present. In the present embodiment, this is done by maintaining the fibers at right angles and shifting the fibers relative to one another, to select different crossover points. The presence or absence of liquid can be detected by illuminating the junction with white light and analyzing an interference pattern produced.

The primary measurement for each of adhesion and cohesion is the force necessary to separate the two fibers from contact. Each force measurement is preferably normalized by the area of contact between the two fibers, before including the normalized result in the fiber mechanical parameters.

Figure 6A:
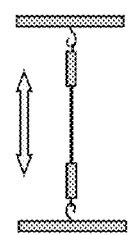
FIG. 6A is a schematic illustration of a way of measuring Young's modulus for a single fiber.

There are also several ways to measure Young's modulus, bending modulus, and torsional modulus. FIG. 6A is a schematic illustration of a way of measuring Young's modulus for a single fiber. The fiber is suspended between two suspension points and is extended longitudinally until breakage occurs. The stress versus strain curve is recorded as the fiber is stretched. The elastic modulus (Young's modulus) is determined as the slope of the linear part of the stress-strain curve.

Figure 6B:
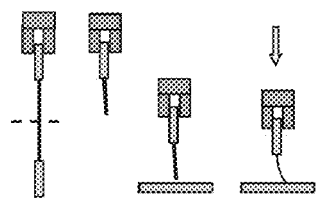
FIG. 6B is a schematic illustration of a fiber suspended between two suspension points in order to measure bending modulus.

To measure bending modulus, a fiber is again suspended between two suspension points, as shown in FIG. 6B. The fiber is then cut, to leave one free end suspended from an upper suspension point. The cut end of the fiber is pressed down on a plate comprising a force sensor. The bending force and the bending modulus can then be determined. For all single fiber modulus measurements (Young's modulus; shear/torsional modulus, bending modulus) the knowledge of the cross sectional area or ellipticity or minor and major axis of the ellipsis of the fiber is needed at the point of measurement to normalize the measured forces to the cross-section of the fiber The bending method gives information about the softness (flexibility) of a fiber.

The force measurements for determining the bending modulus and Young's modulus can be conducted using a Dia-Stron MTT600 or FBS900 tester. Note that, since the fiber in the bending method is cut beforehand, and the fiber in the tensile test is stretched to breakage, different fibers from the same sample should be used for each of these tests. For example, torsion and bending can be measured on one fiber, with the tensile properties being measured on a second fiber. Alternatively, torsion and tensile properties can be measured on one fiber, with the bending modulus being measured on a second fiber.

The torsional behavior of hair fibers has been reported in the literature by several authors. This can be determined using the torsion pendulum method. For this method, a formula for calculating the Shear Modulus G' has been published. See for example Robbins (C. R. Robbins, "Chemical and Physical Behavior of Human Hair", Springer-Verlag, 2002, 4$^{th}$ Edition). The formula is reproduced in equation (1) below. This equation is based on *Ip the Polar Moment of Inertia of the Cross Section*.

$$\text{Shear Modulus } G' = 4\pi^2 * L * M / T^2 * Ip \quad (1)$$

$$= 128\pi * L * M / T^2 * d^4$$

L=Length of fiber, [m]
M=Moment of Inertia of Pendulum [kg*m$^2$]
T=Period of Oscillation [s]
Ip=Polar Moment of Inertia of Cross Section [m$^4$]
d=Fiber Diameter Originally, Ip in equation (1) was based on a circular fiber cross section (see equation (2) below). It can be adapted to take into account an elliptical cross section for Ip (see equation (3) below).

$$\text{For Circular Cross Section } Ip=\pi d^4/32 \quad (2)$$

$$\text{For Elliptical Cross Section } Ip=\pi(d\text{min}^3*d\text{max}+d\text{max}^3*d\text{min})/64 \quad (3)$$

It has been found that calculating the Shear Modulus G' by these equations often results in a large standard deviation. Without wishing to be bound by theory, it is believed that this is due to a dependency between shear modulus and ellipticity of the hair fiber cross-section. Ellipticity=dmin/dmax, where dmin is the minimum diameter of the hair fiber cross-section and dmax is the maximum diameter. That is, dmin and dmax are the dimensions along the minor and major axes, respectively, of the elliptical cross-section.

It is therefore proposed to replace Ip with the *Torsional Moment of Inertia of Cross Section* (I$_t$), for elliptical cross-sections.

$$It=(\pi(d\text{min}^3*d\text{max}^3))/(16*(d\text{min}^2+d\text{max}^2)) \quad (4)$$

This has been found to reduce the standard deviation with respect to ellipticity. Accordingly, the torsional modulus in the set of fiber mechanical parameters is preferably defined as the Shear Modulus G', calculated using the torsional moment of inertia of cross-section—that is, using I$_t$ in place of Ip in equation (1) above.

The length of each fiber tested as described above is preferably in the range 1 cm to 3 cm. In some embodiments, the parameters may be measured separately for each of a plurality of segments of each hair fiber, from root to tip. This would allow the variation in mechanical parameters along the length of a hair fiber to be captured; thereby potentially providing greater accuracy in the simulation.

Many variations are possible to the embodiment described above. For example, the 3-D fiber geometry information may be obtained in different ways. One alternative to OCT is laser scanning of the plurality of fibers. The raw data from a laser scan is a point cloud which needs to be processed to form a 3-D structure of fibers. An advantage of laser scanning is that it recognizes a 3-D shape with high precision. Laser scanning can be used on humans with suitable safety precautions. Another alternative to OCT is micro computed tomography (μ-CT). This is x-ray imaging in 3-D using techniques similar to hospital CT scans but on a smaller scale with increased resolution: μ-CT can have a voxel size of about 25 μm or less. It may be more suitable for small tresses of hair, since it is able to investigate only a limited volume. Also, since it relies on irradiating the sample with x-rays, it may be better suited to small laboratory samples rather than in vivo scanning of human hair. A further difficulty of μ-CT is that it may be difficult to distinguish individual fibers due to fusion.

Hair geometry could also be captured by a combination of techniques—for example, a combination of laser scanning and OCT—to allow for complete 3-D hair geometry to be captured via stitching.

It is not essential that the fiber geometry information is obtained by scanning a real sample. The geometry information may be synthetic—for example, it may be a virtual hairstyle designed using a computer graphics tool, which does not necessarily have any analog in the real world.

In the embodiment described above, the computational model of each fiber was based on a discretized Cosserat rod. Again, this is not essential. Other computational models are known in the art.

As mentioned previously, the scope of the present invention is not limited to simulation of hair fibers. The plurality of fibers to be simulated maybe fibers of any type. For example, they may be fibers in a woven or nonwoven textile, or fibers forming bristles of a brush. The fibers need not be simulated in isolation—for example, the interaction of fibers with other solid objects, liquids, or gases may be simulated. In one embodiment, the fibers to be simulated comprise the bristles of a toothbrush and the simulation comprises simulating the interaction of the bristles with teeth, gums, or other oral-cavity tissue. The method would allow the interaction of individual fibers with the surface of the teeth to be predicted. This may improve understanding of the processes involved, for example with a view to designing better toothbrushes or evaluating different brushing techniques in a virtual simulation.

Figure 4:
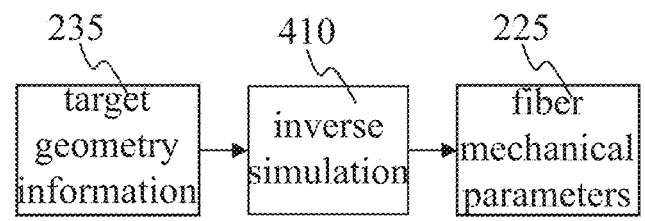
FIG. 4 is a flow diagram showing a logical information flow in a method according to a further embodiment of the invention.
Figure 5:
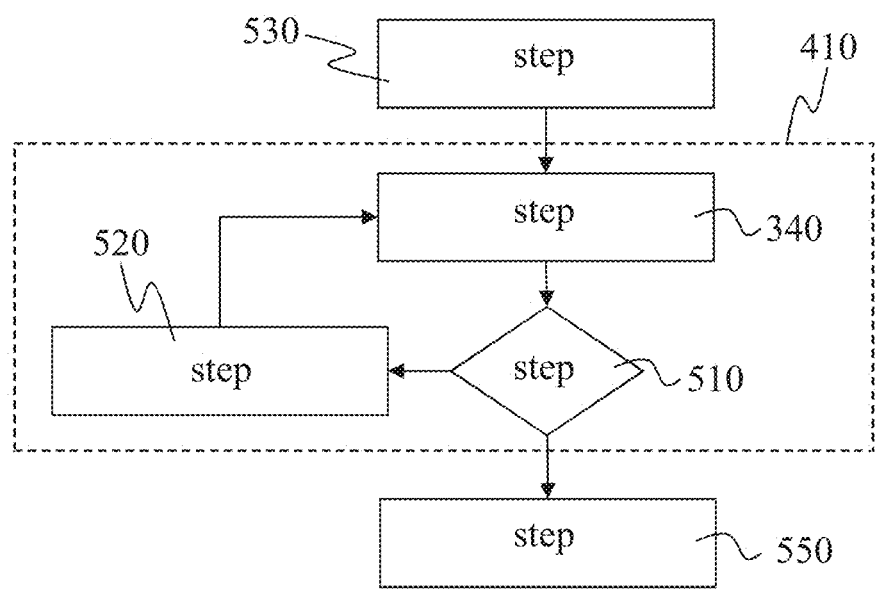
FIG. 5 is a flowchart of an inverse simulation method according to an embodiment.

FIGS. 4-5 illustrate an extension of the simulation method of FIG. 3. Once again, this method will be explained in the context of simulating hair fibers, but those skilled in the art will understand that the scope is not limited in this way.

FIG. 4 is a schematic flow diagram showing the logical information flow according to one exemplary embodiment. The input to the method is target geometry information 235. This may represent, for example, a desired hairstyle that a stylist wishes to achieve for a customer. This target geometry information 235 is used by an inverse simulation 410 to derive a target-set of fiber mechanical parameters 225. The target-set is a set of fiber mechanical parameters that—if achieved—would allow the desired hairstyle (as defined by the target geometry information) to be created.

The target fiber mechanical parameters can help to guide the stylist in achieving the desired hairstyle. For example, the stylist might see from the target mechanical parameters that the hair needs to exhibit lower friction and greater bending stiffness, in order to achieve the target geometry. Based on his/her expert knowledge, the stylist can then choose appropriate treatments that would bring the hair closer to the target set of parameters, thereby making it easier for the stylist to achieve the target geometry.

The method will be described in greater detail with reference to FIG. 5. In step 530, the processor 106 receives the target geometry information 235. The target geometry information 235 may be generated or obtained in a variety of ways. In one example, the customer's wishes would be transferred to a 3-D virtual hairstyle by the stylist, during a consultation. This could be done by starting from a 3-D scan of the customer's existing hairstyle and modifying it using computer graphics tools, in real time, in response to feedback from the customer. Alternatively, the starting point could be one of a number of entirely synthetic "standard" hairstyles, stored in the storage medium 102 of the computer 100. The customer could choose the standard hairstyle that is most similar to his or her desired target and could then—in consultation with the stylist—adapt the geometry of this hairstyle to customize it to his or her wishes. In another example, the target hairstyle could be extrapolated from a 2-D sketch or photo, to derive 3-D target geometry information. In each case, the target geometry information defines the 3-D position of each segment of each hair fiber. In the present embodiment, it is assumed that the velocity of each segment is zero—in other words, that the hair is motionless in the specified target geometry.

The inverse simulation 410 proceeds using an "analysis by synthesis" approach. This is initialized by choosing an initial set of fiber mechanical parameters and adopting a starting geometry. The initial set of fiber mechanical parameters may be chosen randomly or may be dependent to some extent upon the target geometry information. The starting geometry may be based on the customer's current hairstyle. The process then applies an iterative approach. In step 340, the processor 106 simulates the configuration change that is caused by applying the initial set of fiber mechanical parameters to the initial geometry. The output of the simulation is geometry information describing the resulting geometry. In step 510, the processor compares this resulting geometry with the target geometry. Assuming that the two are not yet sufficiently similar, the method proceeds to step 520. In this step, the processor 106 modifies the set of fiber mechanical parameters. The method then returns to step 340 again, for the processor to simulate the change in configuration resulting from the application of the modified fiber mechanical parameters to the starting geometry. Again, the method proceeds to step 510, to check if the new resulting geometry information matches the target geometry sufficiently well. At each iteration, the fiber mechanical parameters are modified so as to drive the resulting geometry information towards the target geometry. This can be achieved in a number of ways, using a number of possible strategies to adjust the parameters. Such strategies include but are not limited to: gradient descent methods; Monte Carlo methods; and genetic algorithms.

When the method determines, in step 510, that the current resulting geometry information is sufficiently similar to the target geometry, the iterations terminate. At that point, the modified fiber mechanical parameters from the final iteration are chosen as the target fiber mechanical parameters (step 550). The iterations can be terminated based on several possible rules. For example, the iterations may continue until the sum of squared differences between the current geometry information and the target geometry information is less than a predefined threshold. Alternatively, the iterations may continue until the sum of squared differences ceases to reduce between iterations. Those skilled in the art will appreciate that the sum of squared differences is merely one of a number of possible suitable metrics to use for assessing the quality of the geometry.

In the example of FIG. 5, the inverse simulation 410 was conducted by iterating the forward simulation and updating the fiber mechanical parameters in each iteration. However, in general, it is not necessary to follow an iterative approach. For example, a plurality of simulations 340 could be run in parallel, using different fiber mechanical parameters. This could be combined with an iterative approach, by iterating each of the parallel simulations, in a similar manner to that described above. This may allow faster and/or broader exploration of the full parameter space.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for simulating a change in configuration of a plurality of fibers, the method comprising:
    providing a computational model for describing mechanical behavior of fibers;
    obtaining a first set of fiber mechanical parameters, associated with fibers of a predetermined type, for use with the computational model;
    obtaining first geometry information, describing the shape and position of the plurality of fibers to be simulated; and
    simulating, using the computational model, the first set of fiber mechanical parameters, and the first geometry information, the change in configuration of the plurality of fibers, to produce second geometry information,
    rendering, based on the simulation, one or more images showing the plurality of fibers after the change in configuration;
    wherein the first set of fiber mechanical parameters comprises:
        a measure of cohesion among fibers of the predetermined type;
        a measure of adhesion among fibers of the predetermined type;
        a shear modulus associated fibers of the predetermined type; wherein the shear modulus is calculated using the Torsional Moment of Inertia of Cross-Section ($I_1$).

2. The method of claim 1, wherein the first set of fiber mechanical parameters is selected from the group consisting of:
    a Young's modulus associated with fibers of the predetermined type;
    a bending modulus associated with fibers of the predetermined type; and combinations thereof.

3. The method of claim 1, wherein the first set of fiber mechanical parameters is selected from the group consisting of
    a diameter associated with fibers of the predetermined type;
    a material density of fibers of the predetermined type;
    a cross-sectional shape or an ellipticity associated with fibers of the predetermined type; and combinations thereof.

4. The method of claim 1, wherein the change in configuration that is simulated is selected from the group consisting of motion of the fibers;

mechanical manipulation of the fibers;

shortening or lengthening of the fibers;

a chemical or physical treatment of the fibers that modifies their mechanical behavior; and combinations thereof.

5. The method of claim 1, further comprising:

providing a database comprising a set of fiber mechanical parameters for each of a plurality of different types of fiber, wherein the step of obtaining the first set of fiber mechanical parameters comprises choosing one of the sets in the database.

6. The method of claim 5, wherein the database comprises one or more additional sets of fiber mechanical parameters for each type of fiber, wherein each of the one or more additional sets characterizes the mechanical parameters of that type of fiber after a respective chemical or physical treatment.

7. The method of claim 1, wherein the first and second geometry information describes the positions of a plurality of segments of each of the fibers.

8. The method of claim 1, wherein the first geometry information is obtained from a real sample of fibers and the step of obtaining the first geometry information selected from the group consisting of micro computed tomography;

laser scanning;

IR-imaging; and optical coherence tomography.

9. The method of claim 1, wherein the computational model is selected from the group consisting of:

a Cosserat rod for each fiber;

a finite element based description for each fiber;

a Kirchoff rod for each fiber;

an oscillator network for each fiber; and combinations thereof.

10. The method of claim 1, wherein the plurality of fibers comprises a tress of hair or a head of hair.

11. The method of claim 1, further comprising:

receiving target geometry information defining a desired configuration of the plurality of fibers; and deriving, based on the target geometry, a target set of fiber mechanical parameters suitable for producing the target geometry, wherein deriving the target set of fiber mechanical parameters comprises:

generating a plurality of modified sets of fiber mechanical parameters;

for each of the modified sets, simulating the change in configuration produced by that modified set; and selecting as the target set the modified set which produces a change in configuration that best approximates the target geometry.

12. The method of claim 1, wherein the first set of fiber mechanical parameters further comprises two or more coefficients of friction, wherein each coefficient of friction pertains to a different mutual orientation, thereby allowing anisotropic friction effects to be described.

13. A non-transitory computer readable medium comprising a computer program comprising computer program code configured to control a physical computing device to perform all the steps of a method according to any one of the preceding claims when said program is run on the physical computing device.

14. A computer-implemented method for simulating a change in configuration of a plurality of fibers, the method comprising:

providing a computational model for describing mechanical behavior of fibers;

obtaining a first set of fiber mechanical parameters, associated with fibers of a predetermined type, for use with the computational model;

obtaining first geometry information, describing the shape and position of the plurality of fibers to be simulated; and simulating, using the computational model, the first set of fiber mechanical parameters, and the first geometry information, the change in configuration of the plurality of fibers, to produce second geometry information, rendering, based on the simulation, one or more images showing the plurality of fibers after the change in configuration;

wherein the first set of fiber mechanical parameters comprises:

a measure of cohesion among fibers of the predetermined type;

a measure of adhesion among fibers of the predetermined type;

a Young's modulus associated with fibers of the predetermined type;

a shear modulus associated fibers of the predetermined type;

a bending modulus associated with fibers of the predetermined type.

15. The method of claim 14, wherein the first set of fiber mechanical parameters further comprises:

a diameter associated with fibers of the predetermined type;

a material density of fibers of the predetermined type; and a cross-sectional shape or an ellipticity associated with fibers of the predetermined type.

* * * * *